Oct. 31, 1967 R. L. MASON 3,350,592

DEFLECTION YOKE WITH CONTACTS MATING WITH YOKE COVER CONTACTS

Filed May 10, 1965

INVENTOR.
Richard L. Mason
BY Mueller & Aichele
Attys.

3,350,592

DEFLECTION YOKE WITH CONTACTS MATING WITH YOKE COVER CONTACTS

Richard L. Mason, Elmhurst, Ill., assignor to Motorola, Inc., Franklin Park, Ill., a corporation of Illinois Filed May 10, 1965, Ser. No. 458,816
5 Claims. (Cl. 313—76)

ABSTRACT OF THE DISCLOSURE

The yoke assembly for a television receiver cathode ray tube includes a yoke body having a plurality of electrical contacts. The assembly also includes a cover having a corresponding plurality of electrical contacts in mating alignment with the contacts on the yoke body. Leads from the contacts on the cover are for connection to the deflection circuits in the television receiver.

This invention relates generally to television receivers, and more particularly to an improved deflection yoke assembly for such a receiver.

Present day television receivers generally utilize electromagnetic deflection, and incorporate a deflection yoke which fits over the neck of the cathode ray tube. This yoke contains a plurality of windings and magnetic cores positioned so that when signals are applied to the windings, magnetic fields are created to deflect the electron beam in the cathode ray tube in the desired manner. These signals are applied to the yoke from deflection circuits in the television receiver chassis. The yoke also includes a mounting clamp and a centering device for properly centering the raster on the picture tube. To facilitate assembly to these yokes during production, the leads from the windings generally are connected to a plug. A mating socket is attached to leads coming from the respective circuits in the television receiver chassis, and once the yoke assembly is mounted, the plug connection may be made to connect the circuits with the windings. The extra time and expense needed to manufacture and assemble this apparatus, including the plug and socket, adds a considerable sum to the total cost of manufacturing the television receiver.

Accordingly, it is an object of this invention to reduce the cost of manufacture and the time of assembly for television receivers.

Another object of the invention is to eliminate the need for an extra plug connection from the deflection yoke assembly to the receiver circuitry in a television receiver.

A feature of the invention is the provision, in a deflection yoke assembly for a television receiver, of a cover member including a mounting clamp and a centering device for the electron beam in the cathode ray tube and which also serves as a plug connector to the deflection circuits of the receiver chassis.

Another feature of the invention is the provision of a yoke assembly including a yoke body and cover member having mating electrical contacts to provide a removable plug type connector for converting the deflection yoke windings to the receiver deflection circuits.

Figures 1, 2, 3, 4:
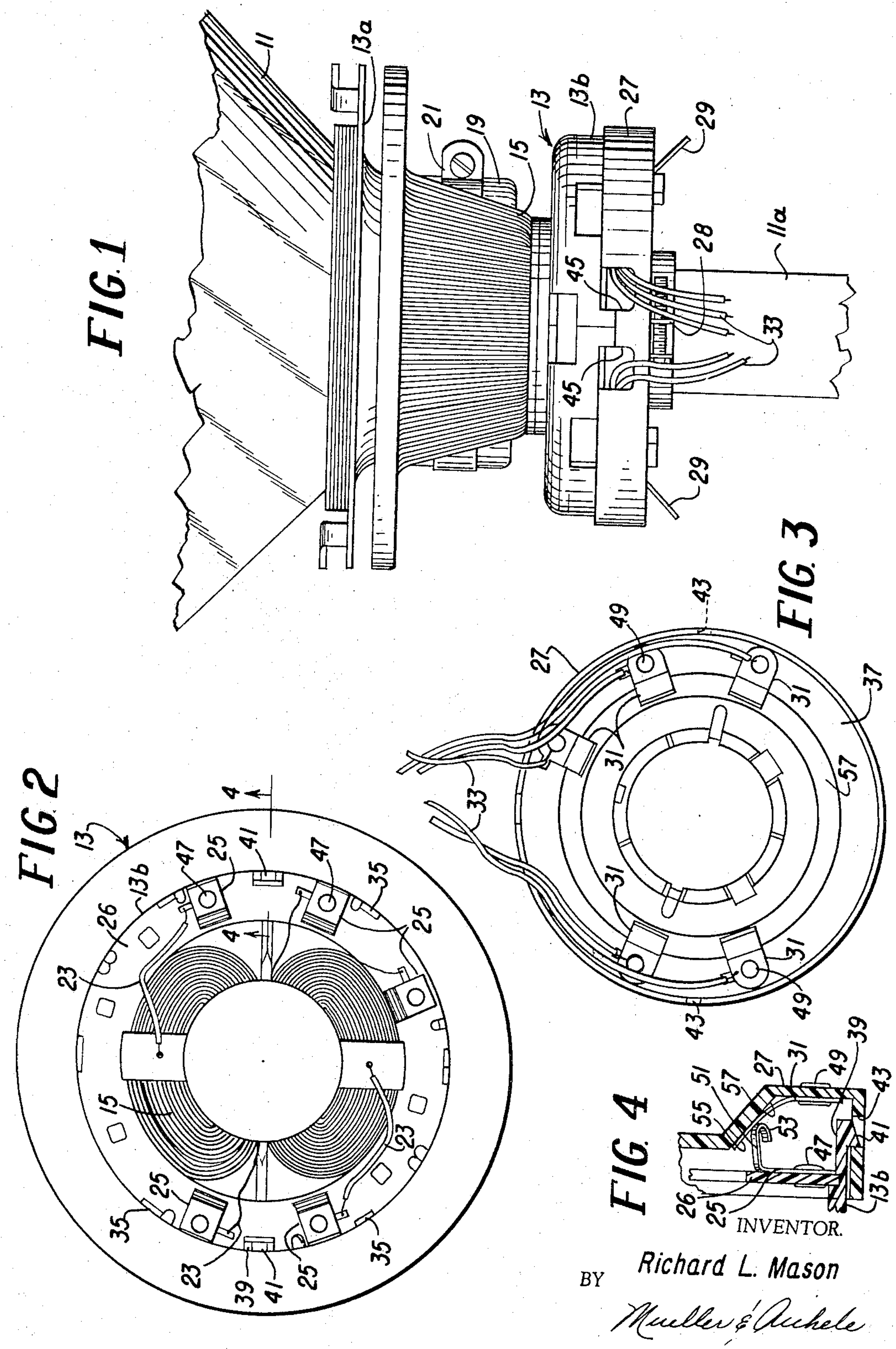
FIG. 1 is an elevational view of a deflection yoke assembly constructed in accordance with the invention.
FIG. 2 is a view of the mating surface of the yoke body.
FIG. 3 is a view of the mating surface of the cover member for the yoke assembly.
FIG. 4 is a sectional view taken along the line 4—4 of FIG. 2 with the cover member of FIG. 3 in place.

In practicing the invention, a yoke assembly for the cathode ray tube of a television receiver is comprised of a yoke body and a cover member for the rear portion thereof. Deflection windings are positioned on the yoke body together with the proper magnetic cores therefor. Connection is made from the windings to a plurality of contacts on the rear portion of the yoke body. These contacts are in mating alignment with a plurality of contacts on the cover member for the rear portion. This cover member may also include provision for centering the electron beam of the cathode ray tube and for clamping the yoke assembly on the neck of the cathode ray tube. A plurality of leads extend from the respective contacts of the cover member through an opening in the side thereof, and are attached directly to the various deflection circuits in the television receiver chassis. The cover member, therefore, replaces the plug connection used in prior apparatus of this type.

Referring now more particularly to FIG. 1, a portion of cathode ray tube 11 is shown with a deflection yoke assembly mounted on the neck thereof. The yoke assembly fits over the neck 11*a* of cathode ray tube 11, abutting the bulb portion thereof. The electron beam which is emitted by the cathode, now shown, in the neck 11*a* of the cathode ray tube 11 is deflected by the deflection yoke assembly to produce the desired image on the view screen of cathode ray tube 11. Deflection circuits in the chassis of the television receiver produce the desired signals which are then applied to the windings in the yoke assembly as will be explained.

Referring now to both FIGS. 1 and 2, the construction of the yoke body may be seen more clearly. The yoke body 13 includes a flanged portion 13*a* which mates with part of the bulb portion of cathode ray tube 11. A plurality of windings 15 are postiioned on yoke body 13 in relationship to internal magnetic core 19. Core 19 surrounds the yoke body and is secured thereon by means of a ring clamp 21 which surrounds the same and compresses it against the yoke body 13 beneath windings 15.

A plurality of leads 23 extend from windings 15 and terminate in a plurality of respective contacts 25 located on a mounting ring 26 on the rear portion 13*b* of yoke body 13.

Referring now to FIGS. 1 and 3, the construction of the cover member may be more clearly observed. Cover member 27 contains a pair of arms 29 which may be moved to adjust magnetic rings to center the electron beam for proper centering of the picture image or raster on the screen of the cathode ray tube 11 as is well known in the art. Cover member 27 also has a clamp 28 thereon for securing to the neck 11*a* of the tube 11. In addition to the conventional functions of centering the electron beam, covering the open end of the rear portion 13*b* of yoke body 13, and clamping the yoke assembly in place, cover member 27 replaces the conventional yoke plug. Cover member 27 is provided with a plurality of contacts 31 which are in mating alignment with contacts 25 on rear portion 13*b* when cover member 27 is positioned thereon. Contacts 31 are connected to a plurality of leads 33 which directly connect contacts 31 to appropriate horizontal and vertical deflection circuits in the television receiver chassis.

As may be seen from FIG. 1, cover member 27 fits over the outside of the rear portion 13*b* of yoke body 13. A plurality of fingers 35 (see FIG. 2) extend upwardly from rear portion 13*b* and engage the inner surface 37 of cover member 27 to properly space the cover thereon. In addition, two upright members 39 have tabs 41 thereon which snap into openings 43 in the side of cover member 27 to properly locate and secure cover member 27 on body 13. A pair of cut-out portions 45 allow leads 33 to extend outwardly from the deflection yoke assembly when cover member 27 is in place.

Referring now particularly to FIG. 4, the function of the respective contacts 25 and 31 may be observed. Contacts 25 and 31 are secured respectively to mounting ring 26 and cover member 27 by means of rivets 47 and 49, and are made of resilient material. Contact 25 has an upright arm 51 terminating in a U-shaped end 53. Contact 31 includes an extension portion 55 thereon, extending along the slanted portion 57 of the inner surface 37 of cover member 27. As shown in FIG. 4, when cover member 27 is properly mounted on yoke body 13, the U-shaped end 53 of portion 51 resiliently engages extension portion 55. Firm electrical contact between leads 33 and windings 15 is maintained by the snap locking of tabs 41 in openings 43. The cover member 27 thereby acts in its conventional capacity as a cover and mounting for the centering device and further as a yoke plug, eliminating the need for a conventional type plug between leads 33 and the various circuits in the chassis of the television receiver.

It may therefore be seen that the invention provides an improved deflection yoke assembly in which the need for a separate yoke plug is eliminated, reducing the cost of manufacture and assembly. Where heretofore it was required that a separate plug and socket be manufactured, installed and connected in the construction of television receivers, the present invention effectively eliminates the separate plug, and enables integration of yoke mounting and connection in a single operation.

I claim:

1. A deflection yoke assembly for use in a television receiver having a cathode ray tube and deflection circuits therefor, said deflection yoke assembly including in combination, a yoke body having a rear portion with a plurality of contacts thereon, winding means on said yoke body having leads extending therefrom terminating in respective ones of said contacts, a cover member having centering means thereon for the electron beam in the cathode ray tube, said cover member further having a plurality of contacts thereon mating with respective ones of said contacts on said rear portion of said yoke body, and a plurality of leads directly connecting respective ones of said contacts on said cover member with the deflection circuits in the television receiver, whereby said cover member also serves as a plug connector in said yoke assembly.

2. In a television receiver having a cathode ray tube, and deflection circuits therefor, a deflection yoke assembly including in combination, a yoke body having a rear portion with a plurality of contacts thereon, winding means on said yoke body having leads extending therefrom terminating in respective ones of said contacts, a cover member having centering means thereon for the electron beam in the cathode ray tube, means on said rear portion and on said cover member engageable to maintain said cover member and yoke body in proper alignment, said cover member further having a plurality of contacts thereon mating with respective ones of said contacts on said rear portion of said yoke body, and a plurality of leads directly connecting respective ones of said contacts on said cover member with the deflection circuits in the television receiver, whereby said cover member also serves as a plug connector in said yoke assembly.

3. In a television receiver having a cathode ray tube and deflection circuits therefor, a deflection yoke assembly including in combination, a yoke body having a rear portion with a plurality of contacts thereon, winding means on said yoke body having leads extending therefrom terminating in respective ones of said contacts, a cover member having centering means thereon for the electron beam in the cathode ray tube and further having means for mounting said yoke assembly on the cathode ray tube, said cover member further having five contacts thereon to correspond with respective ones of said contacts on said rear portion of said yoke body, means on said rear portion and on said cover member engageable to secure said cover member on said rear portion with respective ones of said contacts on said cover member engaging corresponding ones of said contacts on said rear portion of said yoke body, and a plurality of leads directly connecting respective ones of said contacts on said cover member with the deflection circuits in the television receiver, whereby said cover member also serves as a plug connector in said yoke assembly.

4. In a television receiver having a cathode ray tube and deflection circuits therefor, a deflection yoke assembly including in combination, a yoke body having a rear portion with contacts thereon, winding means on said yoke body having leads extending therefrom terminating in respective ones of said contacts, a cover member having centering means thereon for the electron beam in the cathode ray tube and having a clamp for mounting the yoke assembly on the neck of the cathode ray tube, said cover member further having contacts thereon resiliently engaging with respective ones of said contacts on said rear portion of said yoke body, snap locking means on said rear portion engaging openings on said cover member to secure said cover member on said rear portion in proper alignment and to maintain said contacts in resilient engagement, and a plurality of leads connecting respective ones of said contacts on said cover member with the deflection circuits in the television receiver, whereby said cover member also serves as a plug connector in said yoke assembly.

5. A deflection yoke assembly for use in a television receiver having a cathode ray tube and deflection circuits therefor, said deflection yoke assembly including in combination, a yoke body having terminal means with a plurality of electrical contacts thereon, winding means on said yoke body having leads extending therefrom connected to respective ones of said contacts, a cover member having centering means thereon for the electron beam in the cathode ray tube, said cover member further having a plurality of contacts thereon mating with respective ones of said contacts on said terminal means of said yoke body, and a plurality of leads connected to respective ones of said contacts on said cover member and arranged to be connected with the deflection circuits in the television receiver, whereby said cover member also serves as a plug connector in said yoke assembly.

References Cited

UNITED STATES PATENTS 2,753,484 7/1956 Bryant et al.

JAMES W. LAWRENCE, *Primary Examiner.*

ROBERT SEGAL, *Examiner.*